United States Patent [19]

Brosfske

[11] Patent Number: 5,427,487
[45] Date of Patent: Jun. 27, 1995

[54] CARGO STABILIZER FOR PICKUP TRUCKS

[76] Inventor: Frederic G. Brosfske, 1288 N. Pontiac Trail, Walled Lake, Mich. 48390

[21] Appl. No.: 71,586

[22] Filed: Jun. 2, 1993

[51] Int. Cl.$^6$ .............................................. B60P 7/15
[52] U.S. Cl. ....................................... 410/121; 410/150
[58] Field of Search ................. 410/121, 102, 143–153, 410/156; 296/3, 10; 220/529, 534, 544–546; 211/7, 94.5, 105.1

[56] References Cited

U.S. PATENT DOCUMENTS

| | | | |
|---|---|---|---|
| 2,468,101 | 4/1949 | Nampa | 410/150 |
| 2,901,987 | 9/1959 | Campbell et al. | 410/145 |
| 2,947,566 | 8/1960 | Tower | 296/10 |
| 3,051,099 | 8/1962 | Robertson | 410/102 |
| 4,138,046 | 2/1979 | De Freze | 224/42.42 R |
| 4,236,854 | 12/1980 | Rogers | 410/151 X |
| 4,405,170 | 9/1983 | Raya | 296/10 |
| 4,629,085 | 12/1986 | Gerhard | 220/1.5 |
| 4,650,383 | 3/1987 | Hoff | 410/149 |
| 4,770,579 | 9/1988 | Aksamit | 410/150 |
| 4,772,165 | 9/1988 | Bartkus | 410/145 X |
| 5,037,256 | 8/1991 | Schroeder | 410/144 X |
| 5,061,000 | 10/1991 | Haugen et al. | 296/3 |
| 5,139,375 | 8/1992 | Franchuk | 410/105 |

*Primary Examiner*—Michael S. Huppert
*Assistant Examiner*—Stephen Gordon
*Attorney, Agent, or Firm*—Young, MacFarlane & Wood

[57] ABSTRACT

A stabilizer kit for installation in a pickup truck to secure loads within the cargo area of the truck. The kit includes a pair of elongated side rails for securement to the side walls of the pickup; a plurality of crossbars extending transversely of the truck at longitudinally spaced locations within the cargo area and each mounted at its opposite ends for sliding longitudinal adjusting movement on the respective side rails; and an accessory bar extending downwardly from one of the crossbars and mounted at its upper end for sliding transverse adjusting movement on the crossbar. A pin assembly is provided for locking each crossbar in selected positions of longitudinal adjustment on the side rails and for locking the accessory bar in selected positions of transverse adjustment on the crossbar. Further accessories include a telescoping bar secured at its respective opposite ends to longitudinally spaced crossbars; an elongated brace secured at one end to one of the crossbars and extending longitudinally within the cargo area for engagement at its free end with the lower end of an accessory bar to brace the accessory bar; a further accessory bar including socket means sided to slidably receive a 2×4 so as to enable the 2×4 to extend upwardly to a location above the side rails to provide cargo containment in the area above the side rails; and a further accessory bar including a clamp mounted on the lower end of the bar and selectively movable longitudinally relative to the accessory bar to precisely engage a load in the cargo area.

24 Claims, 4 Drawing Sheets

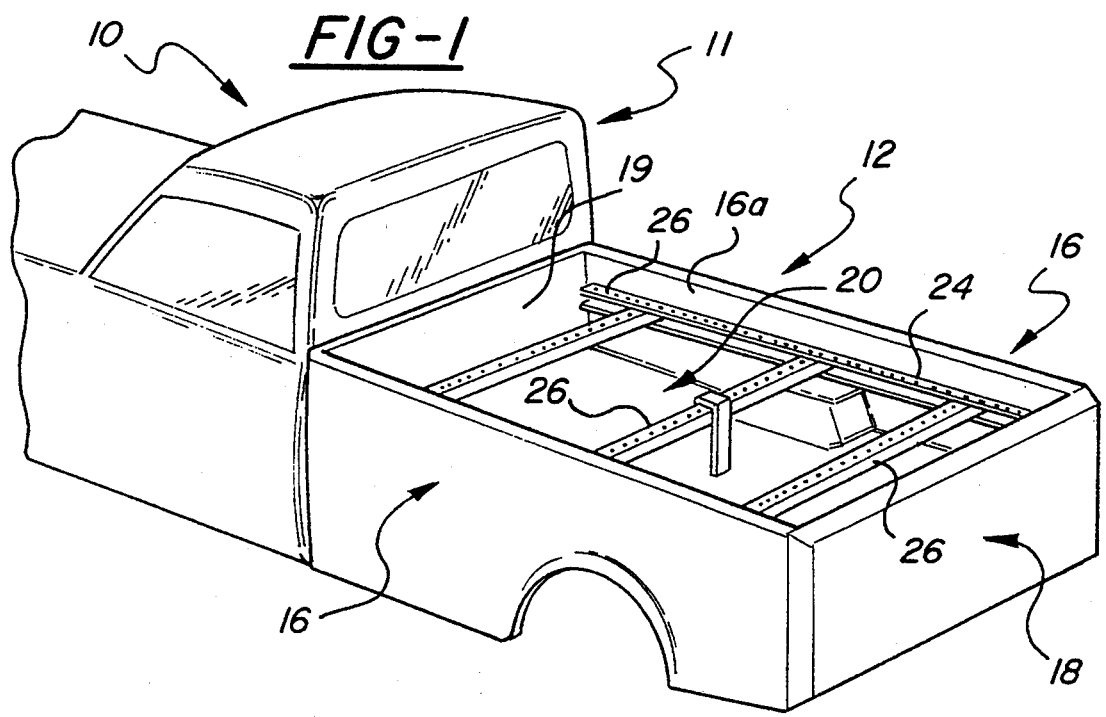
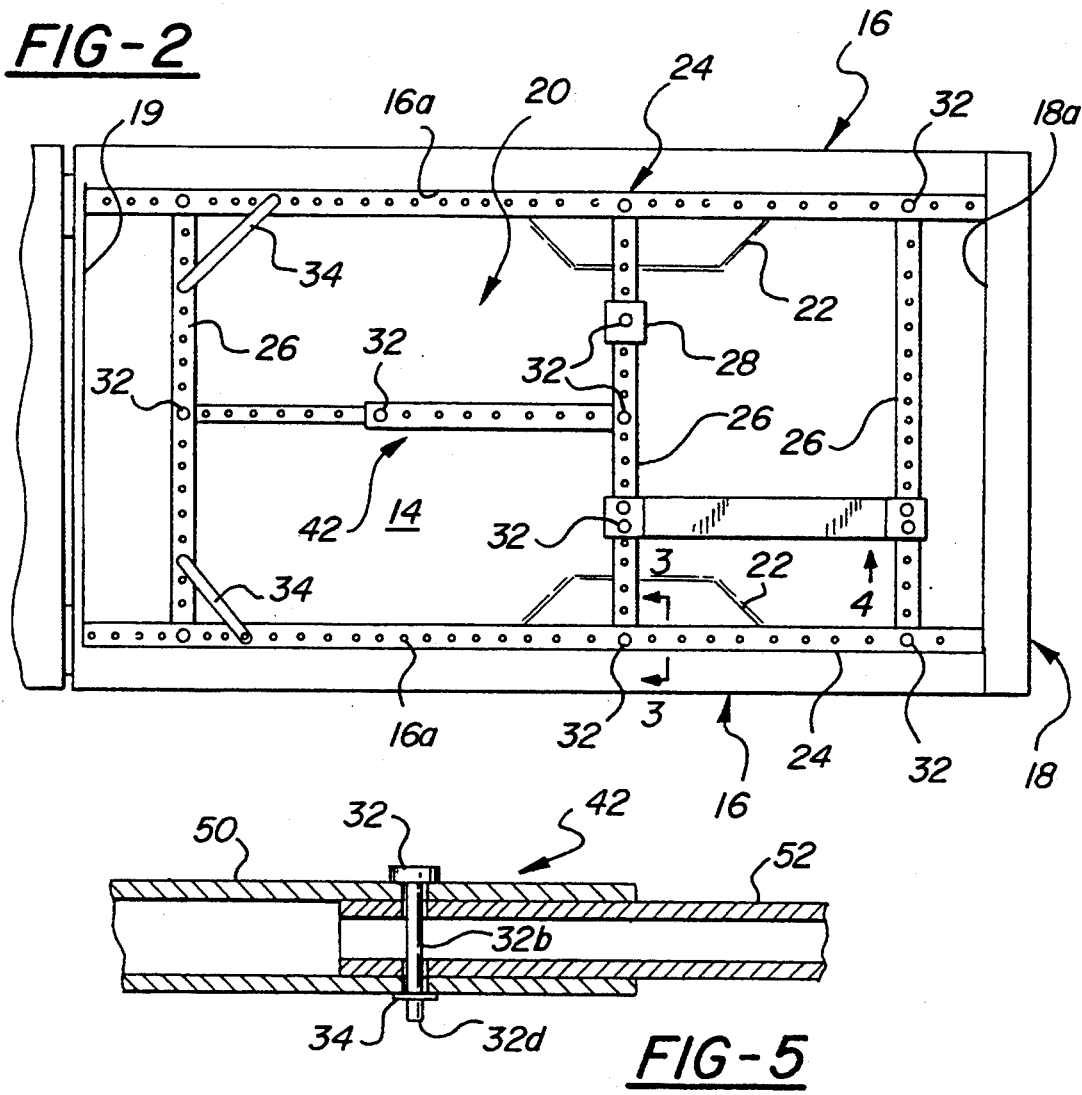

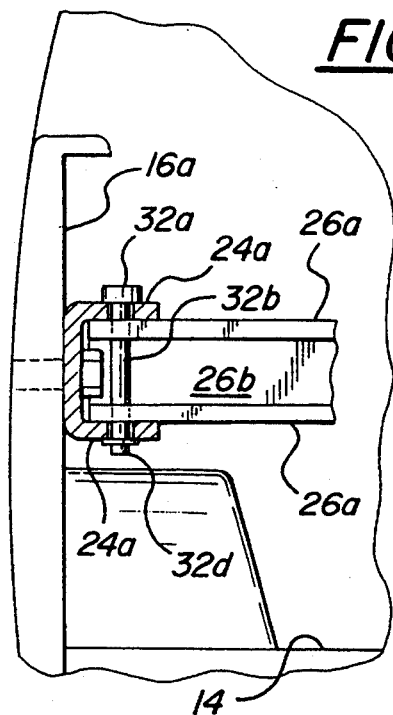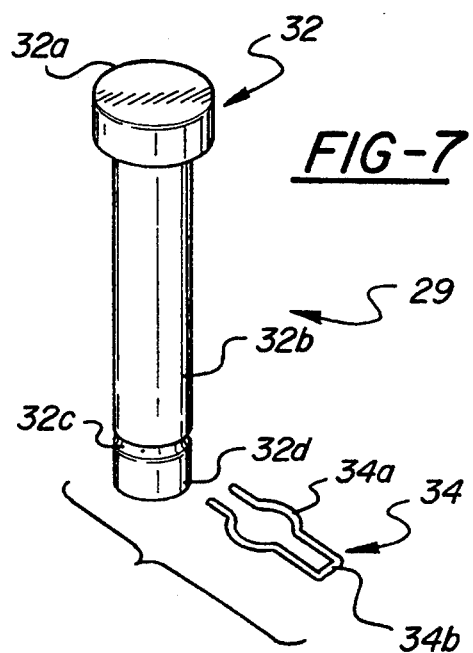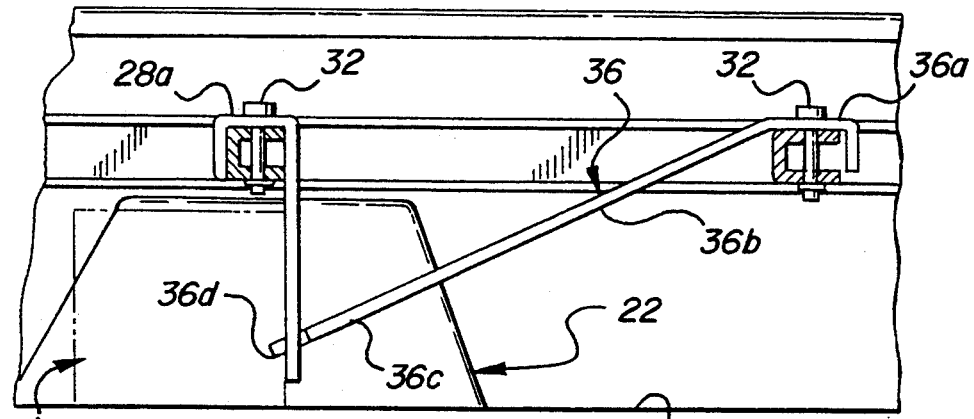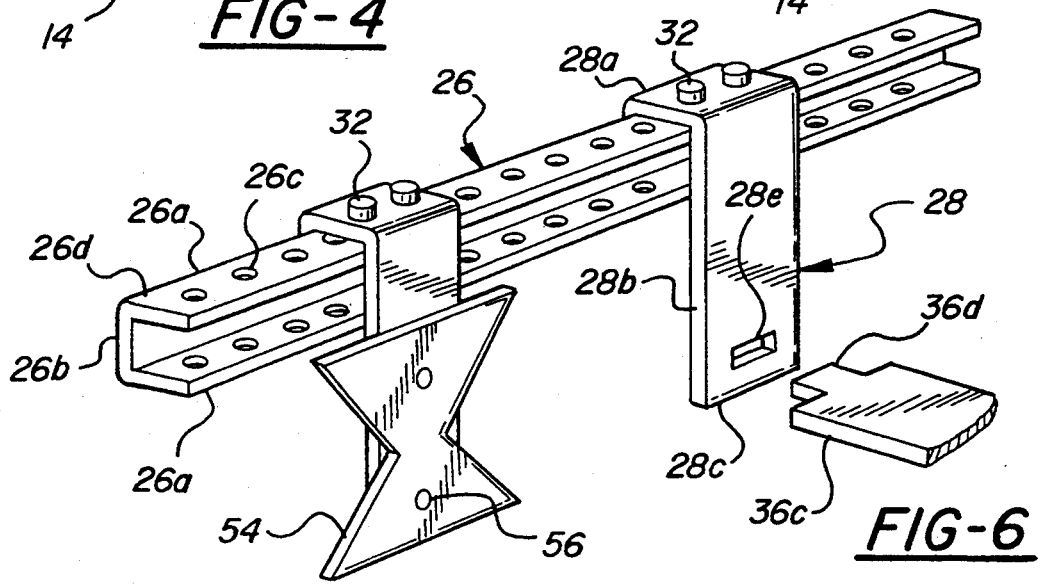

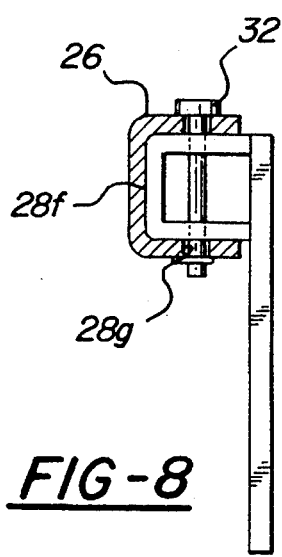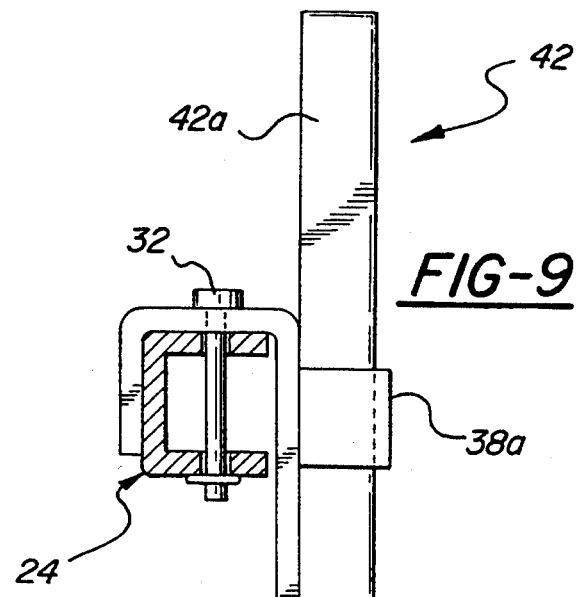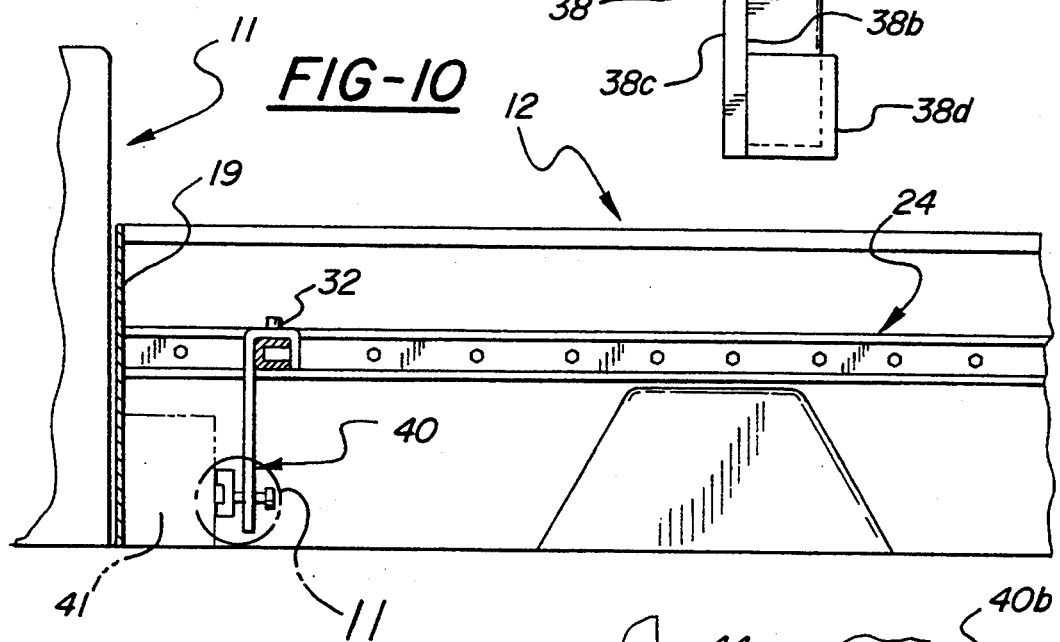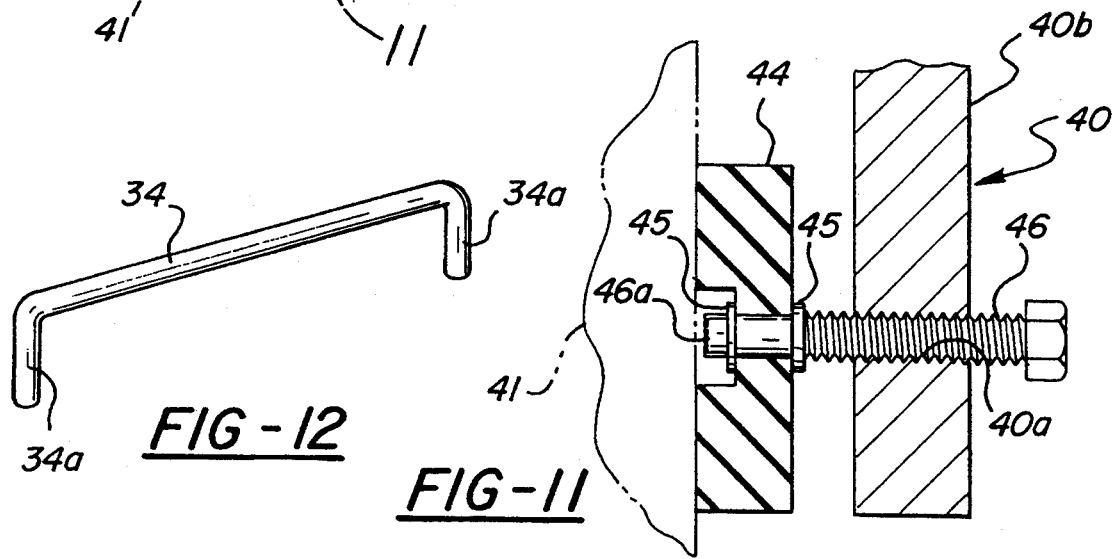

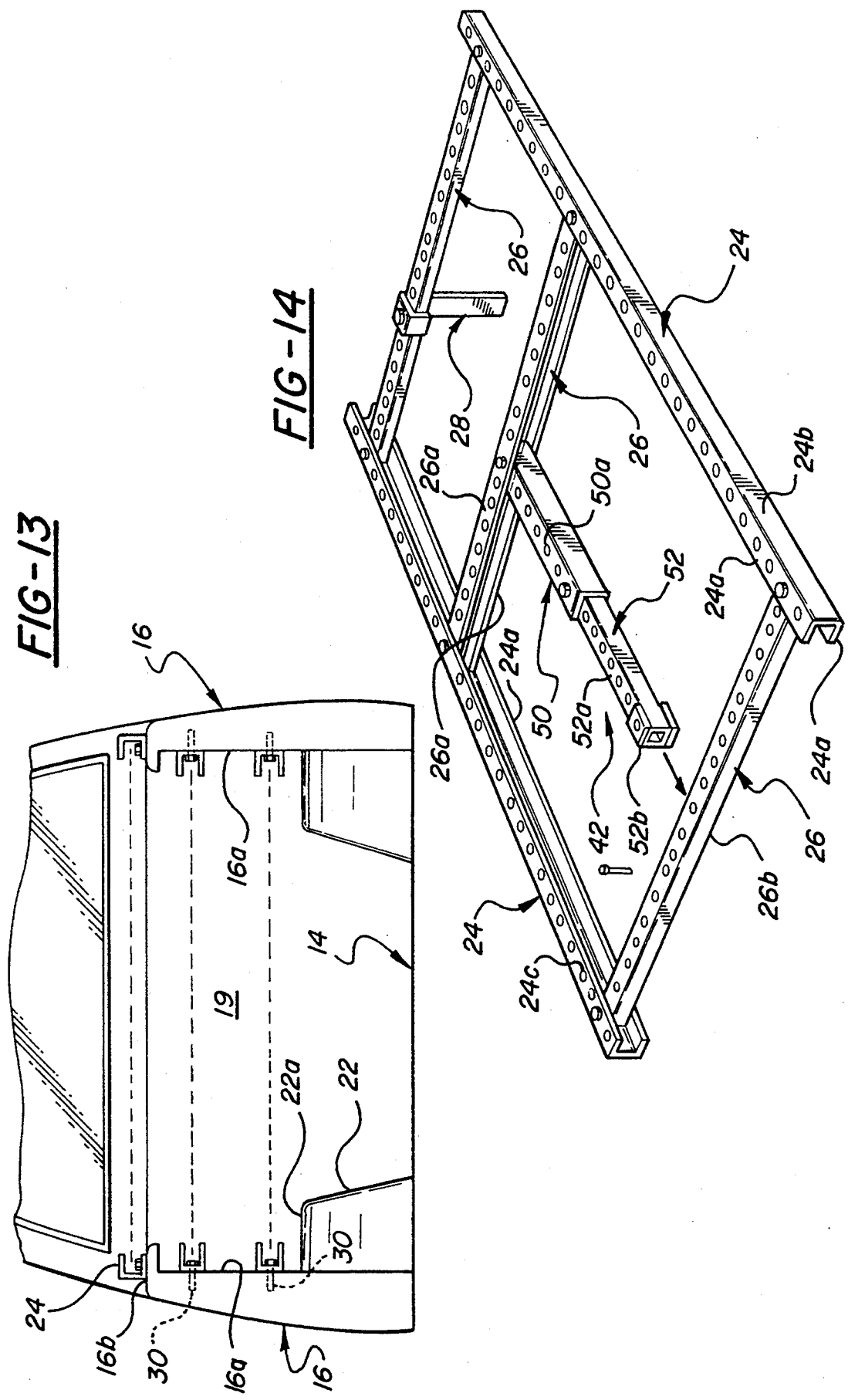

CARGO STABILIZER FOR PICKUP TRUCKS

BACKGROUND OF THE INVENTION

This invention relates to cargo stabilizers and more particularly to a kit especially suitable for use in stabilizing pickup truck cargo.

Pickup trucks are in wide and ever-increasing usage throughout the world and are increasingly used for both business and pleasure. As a result, various sizes and shapes of cargo are routinely carried in the cargo area of pickup trucks and it is desirable that this cargo be secured. Various devices and assemblies have been previously proposed to facilitate the stabilizing of cargo in the cargo area of a pickup truck. However, none of these prior art assemblies have achieved any significant degree of commercial acceptance since they have been unduly complicated and expensive and/or have not served to adequately secure and stabilize the loads typically carried in the cargo area of pickup trucks.

SUMMARY OF THE INVENTION

This invention is directed to the provision of an improved cargo stabilizer for a pickup truck.

The invention stabilizer is intended for use with a pickup truck including a truck bed and spaced sidewalls upstanding from opposite sides of the truck bed and including inboard faces coacting with the truck bed to define an upwardly opening cargo area. According to the invention, the stabilizer includes an elongated side rail adapted to be fixedly secured to each sidewall of the truck and sized to extend substantially the full length of the sidewall; a plurality of crossbars adapted to extend transversely of the truck at longitudinally spaced locations within the cargo area and each mounted at its opposite ends for sliding longitudinal adjusting movement on the respective side rails; an accessory bar extending downwardly from one of the crossbars and mounted at its upper end for sliding transverse adjusting movement on the crossbar; means for locking each crossbar in selected positions of longitudinal adjustment on the side rails; and means for locking the accessory bar in selected positions of transverse adjustment on the crossbar. This arrangement allows cargo of virtually any size and shape to be readily secured within the cargo area.

In one embodiment of the invention, the side rails are secured to the inboard faces of the sidewalls and in a further embodiment the side rails are secured to the upper edges of the side rails. In a specific further embodiment the side rails are secured to the inboard faces of the sidewalls proximate the tops of the wheel housings.

According to a further feature of the invention, the side rails comprise channel members positioned with the channels opening inboard and the ends of the crossbars are slidably received in the channels of the channel members. This arrangement facilitates the ready installation of the stabilizer in the cargo area of the pickup truck and allows ready adjustment of the crossbars to accommodate various loads.

According to a further feature of the invention, the crossbar locking means comprise a series of longitudinally spaced holes in each side rail, holes in each end of each crossbar, and pins sized to fit in the holes in the side rails and in the crossbar. This arrangement allows the relative configuration of the crossbars and side rails to be readily adjusted to suit various loads.

According to a further feature of the invention, the accessory bar locking means comprises a series of transversely spaced holes in each crossbar, at least one hole in the upper end of the accessory bar, and a pin sized to fit in the holes in the accessory bar and in the crossbar. This arrangement allows the accessory bar to be selectably adjusted transversely along the crossbar to accommodate various loads.

According to a further feature of the invention, the stabilizer further includes a telescoping bar adapted to be secured at its respective ends to longitudinally spaced crossbars. This arrangement further increases the versatility of the stabilizer in terms of accommodating various loads.

According to a further feature of the invention, the stabilizer further includes an elongated brace adapted to be secured at one end to one of the crossbars and extend longitudinally from the secured end within the cargo area, and coacting means are provided on the other end of the brace and on the lower end of the accessory bar to allow the brace to bracingly engage the lower end of the accessory bar. This arrangement allows the accessory bar to stabilize even very heavy loads within the cargo area.

According to a further feature of the invention, the accessory bar includes socket means sized to slidably receive the lower end of a 2×4 so as to enable the 2×4 to extend upwardly to a location above the side rails to provide cargo containment in the area above the side rails.

According to a further feature of the invention, the accessory bar includes a clamp mounted on the lower end of the bar and selectably movable longitudinally relative to the accessory bar. This arrangement allows a crossbar to be grossly adjusted on the side rails and then allows the clamp to be finely adjusted with respect to the accessory bar so as to firmly and precisely clamp any size load within the cargo area.

The invention also provides a methodology for stabilizing loads in the cargo area of a pickup truck. According to the invention methodology, a side rail is provided extending longitudinally along each side wall of the truck; a plurality of crossbars are provided extending transversely of the cargo area at longitudinally spaced locations with each crossbar slidably mounted at its opposite ends on a respective side rail; and the upper end of at least one accessory bar is mounted slidably on one of the crossbars with the lower end of the accessory bar extending downwardly into the cargo area. This methodology allows virtually any size and shape of cargo to be firmly contained within the cargo area.

According to a further feature of the invention methodology, a clamp is provided on the lower end of the accessory bar and means are provided to allow the clamp to be finely adjusted longitudinally relative to the lower end of the accessory bar. The methodology allows the crossbars to be adjusted in a gross manner to approximate the stabilizing requirements of a specific cargo whereafter the clamp may be adjusted in a fine manner to provide precise positive clamping of the specific cargo.

According to a further feature of the invention methodology, a brace is secured at one end to one of the crossbars, and the other end of the brace is secured to the lower end of the accessory bar so as to stabilize the accessory bar. This methodology allows even very heavy loads to be readily stabilized within the cargo area.

BRIEF DESCRIPTION OF THE DRAWINGS

FIG. 1 is a perspective, somewhat fragmentary view of a pickup truck embodying the invention stabilizer;

FIG. 2 is a fragmentary plan view of the truck of FIG. 1;

FIG. 3 is a cross-sectional view taken on line 3—3 of FIG. 2;

FIG. 4 is a fragmentary view looking in the direction of the arrow 4 in FIG. 2;

FIG. 5 is a fragmentary detail view of a telescoping bar utilized in the invention stabilizer;

FIG. 6 is a perspective view of a crossbar and accessory bar assembly utilized in the invention stabilizer;

FIG. 7 is an exploded perspective view of a pin assembly utilized in the invention stabilizer;

FIG. 8 is a cross-sectional view of an alternate form of accessory bar;

FIG. 9 is a cross-sectional view of a further accessory device;

FIG. 10 is a somewhat schematic view of a further accessory device;

FIG. 11 is a detail view taken within the circle 11 of FIG. 10;

FIG. 12 is a perspective view of a brace utilized in the invention stabilizer;

FIG. 13 is a somewhat schematic view illustrating various mounting arrangements for the invention stabilizer; and FIG. 14 is a perspective view showing the assembled relation of various components of the invention stabilizer.

DETAILED DESCRIPTION OF THE PREFERRED EMBODIMENT

The invention stabilizer is shown in the drawings in association with a pickup truck 10 including a cab 11 and a pickup box 12 positioned rearwardly of the cab.

Pickup box 12 is defined by a truck bed 14, spaced sidewalls 16, a tailgate 18, and a front wall 19. Sidewalls 16 define inboard faces 16a which coact with truck bed 14, front wall 19, and the forward or inboard face 18a of the tailgate to define a cargo area 20. Wheel housings 22 of known form are positioned within the cargo area and extend inboard from the respective inboard faces 16a of the respective sidewalls.

The invention stabilizer, broadly considered, comprises a pair of elongated side rails 24, a plurality of crossbars 26, at least one accessory bar 28, and a plurality of pin assemblies 29. All of the components of the invention stabilizer are preferably formed from a suitable metallic material such, for example, as a ferrous material, but may also be formed of other materials such as plastic.

Side rails 24 have a channel configuration including upper and lower flange portions 24a and a web portion 24b. Side rails 24 have a length corresponding generally to the length of side walls 16 and include a plurality of longitudinally spaced aligned holes 24c in the upper and lower flanges 24a. Holes 24c may be spaced, for example, at one inch intervals.

Crossbars 26 also have a channel configuration including upper and lower flange portions 26a and a web portion 26b. A plurality of aligned holes 26c are provided in the flange portions 26a of each crossbar and are spaced, for example, at one inch intervals. Crossbars 26 have a width sized to enable them to extend between side rails 24 with the side rails installed proximate the sidewalls of the truck, and have a height such as to enable them to fit slidably within the channels of the side rails.

Accessory bar 28 is formed from plate stock and includes an upper hook portion 28a sized to be fitted over a respective crossbar 26 and a downwardly extending main body plate portion 28b terminating in a lower end 28c. At least one hole 28d is provided in hook portion 28a.

The invention stabilizer is installed in the pickup truck by securing a side rail 24 along each sidewall 16, mounting the crossbars 26 transversely between the side rails and in longitudinally spaced relations with the ends 26d respectively slidably received in the side rails, and then hanging accessory bar 28 over one of the crossbars 26.

Each pin assembly 29 includes a pin 32 and a locking clip 34. Pin 32 includes a head portion 32a, a shank portion 32b, and an annular groove 32c in the shank portion proximate the lower end 32d of the pin. Each clip 34 includes locking portions 34a adapted to fit in groove 32d and a handle portion 34b.

As seen in FIG. 13, the side rails 24 may be positioned on the top edges 16b of the sidewall, may alternatively be positioned along the inboard faces 16a of the side walls slightly below the side wall top edges 16b, or may alternatively be positioned on the inboard faces 16a of the sidewalls proximate the tops 22a of the wheel housings. The side rails may be secured to the sidewalls in any suitable manner and may, for example, be secured utilizing screws 30.

Crossbars 26 are selectively longitudinally positioned along the side rails, and locked in a selected position of longitudinal adjustment, utilizing a pin assembly 29 at each end of the crossbar. The shank portions 32b of the pins are sized to fit loosely through the holes 24c in flanges 24a and in the holes 26c in flanges 26a with the lower ends 32d of the pins projecting below the lower flange 24a of the side rail for engagement by the locking clips 34, and with the heads 32a of the pin positioned against the upper flange 24a. This arrangement allows each crossbar 26 to be positioned longitudinally along the side rails at one inch intervals with the position of the crossbar at each interval firmly and lockingly established by utilization of the pins 32 and locking clips 34.

Pins 32 and locking clips 34 are also utilized to secure accessory bar 28 in any desired position of transverse adjustment along the crossbar 26 with the shank portion 32b of the pin passing loosely through hole 28d in the hook portion of the accessory bar and through holes 26c in the upper and lower flange portions 26a of the crossbar to position the lower end 32d of the pin below the lower flange 26a for receipt of locking clip 34. This arrangement will be seen to allow the accessory bar to be readily transversely adjusted across the entire width of the crossbar 26 with the crossbar being readily and positively locked by the pin 32 and clip 34 in any desired position of transverse adjustment along the crossbar 26. It will be understood that the accessory bar 28 has a length such that, with the stabilizer installed in a pickup truck, the lower end 28c of the stabilizer bar is positioned proximate the truck bed 14 where it may coact with cargo positioned on the truck bed to preclude unwanted movement of the cargo within the cargo area.

The invention stabilizer may also, optionally, include one or more diagonal braces 35, accessory bar braces 36, 2×4 accessory bars 38, clamp accessory bars 40, or telescoping bars 42.

Diagonal braces 35 are formed of bar stock and have down-turned end portions 35a sized to be loosely received in holes 24c, 26c so that the braces may be mounted in diagonal fashion (as seen in FIG. 2) with one end portion 35a received in a hole 24c of a side rail and the other end portion 35a received in a hole 26c of a crossbar so as to firmly and positively brace the crossbar with respect to the side rail.

Accessory bar support brace 36 includes a hook end portion 36a sized to be fitted over a crossbar 26, a main body elongated portion 36b angled downwardly with respect to hook portion 36a, and a free end portion 36c including a finger 36d sized to be received in a rectangular aperture 28e in the lower end of an accessory bar main body portion 28b. Hook portion 36a includes a hole sized to pass the shank portion of a pin 32 so that the hook portion may be fixedly secured to a crossbar 26 in any position of desired transverse adjustment with the main body portion 36b extending longitudinally downwardly from the hook portion to allow the finger 36d on the free end of the main body portion to be positioned in aperture 28e in the main body portion 28b of the accessory bar so as to, as seen in FIG. 4, allow the main body portion 28b of an accessory bar to positively contain even very heavy loads 41 positioned in the cargo area against the accessory bar.

2×4 accessory bar 38 is identical to accessory bar 28 with the exception that the bar further includes a U-shaped guide sleeve 38a secured to the face 38b of the main body portion 38c of the bar and sized to receive a 2×4 39 and a cup-shaped member 38d secured to the lower end of the main body portion and sized to receive the lower end of 2×4 39. Sleeve 38a and cup 38d will be seen to coact to position the upper end 39a of the 2×4 above the level of side rails 24 so as to provide cargo containment for the area above side rails 24.

Accessory bar clamp assembly 40 is identical to accessory bar 28 with the exception that the bar further includes a clamp 44 and a screw bolt 46 threadably received in a threaded bore 40a in the lower end of the main body portion 40b of the accessory bar with the free end 46a of the bolt passing through and secured to the clamp 44 as by lock clips 45 so that rotation of bolt 46 coacts with threaded bore 40a to move clamp 44 longitudinally relative to the main body portion 40b of the accessory bar so as to positively and precisely engage a load 41. Bar clamp assembly 40 in coaction with the associated crossbar 26 allows the crossbar to be grossly adjusted on the side rails relative to a cargo item whereafter the clamp 44 may be finely adjusted with respect to the accessory bar to firmly and precisely clamp the cargo item in the cargo area 20.

Telescoping bar 42 includes an outer tubular member 50 slidably and telescopically receiving an inner tubular member 52. Outer member 50 includes a series of spaced holes 50a and inner member 52 includes a series of longitudinally spaced holes 52a. Holes 50a, 52a coact with pin assemblies 29 to position the members 50 and 52 in a variety of relative positions to provide a variety of overall lengths for the telescoping bar 42. Tubular member 50 has a thickness corresponding to the width of the channel of the crossbars 26 and the free end of tubular member 52 is built up with pads 52b so as to also have an overall width corresponding to the width of the channels of the crossbars 26 so that (as best seen in FIG. 14), the telescoping bar 42 may extend longitudinally between adjacent crossbars 26 with each end of the bar releasably secured to the respective crossbar by a pin assembly 29 passing through aligned holes in the flange portions of the crossbars and in the tubes 50/52. It will be understood that the overall length of telescoping bar 42 may be selectively adjusted as the distance between adjacent crossbars 26 is selectively adjusted.

The invention stabilizer is supplied in kit form with the size of the kit components depending on the size of the pickup in which the kit is to be installed. For example, three different kits may be offered to accommodate compact, intermediate, and full sized pickup trucks. In each case, the crossbars 26 are sized to fit within the channels of the side rails 24 with the side rails installed on the top edges 16b of the sidewalls of the pickup, and the crossbars further include scribings or markings to indicate a location at which the crossbars are to be cut by the user so as to provide the proper length of crossbar for the installations in which the side rails 24 are secured to the inboard faces of the sidewalls.

The invention stabilizer will be seen to provide a simple, inexpensive, and effective means of securing virtually any size or shape load within the cargo area of a pickup truck by selective utilization of the basic side rail and crossbar members in combination with selective employment of the various accessory members.

Whereas a preferred embodiment of the invention has been illustrated and described in detail, it will be apparent that various changes may be made in the disclosed embodiment without departing from the scope or spirit of the invention. For example, the manner in which the accessory bar 28 is secured to the cross rails can be varied as seen in FIG. 8 to include, rather than the upper hook portion 28a, a channel member 28f secured to the upper end of the accessory bar and slidably received in the channel of the crossbar 26 and including holes 28g to allow the accessory bar to be positioned at any desired transverse location along the crossbar utilizing a pin 32 passing through aligned holes in the crossbar and in the channel member 28f. Further, accessory bars 28 may be complemented by the use of load plates 54 which may be secured to the accessory bars utilizing fasteners 56 so as to increase the effective containment area of the accessory bar.

I claim:

1. A pickup truck including a truck bed and spaced side walls upstanding from opposite sides of the truck bed and including inboard faces coacting with the truck bed to define an upwardly opening cargo area, characterized in that the truck includes:

a separate elongated channel side rail fixedly secured to the inboard face of each side wall, each side rail extending for substantially the entire length of the respective side wall, and facing inwardly from the respective side wall to define an inwardly facing channel;

a plurality of cross bars extending transversely to a longitudinal axis of the truck at longitudinally spaced locations within the cargo area, each crossbar positioned at its opposite ends in the channels of the respective side rails for sliding longitudinal adjusting movement on the respective side rails, and each crossbar having a width throughout its length less than the width of the channels of the channel side rails so that the ends of the crossbars may be slidably received within the channels of the side rails and the crossbars may be stowed in their entirety in the channels of the side rails; and means for locking each crossbar in selected positions of longitudinal adjustment on the side rails.

2. A truck according to claim 1 wherein:
the locking means are operative to allow pivotal movement of each crossbar about either end of the crossbar in any position of longitudinal adjustment of the crossbar on the side rails, 3. A truck according to claim 1 wherein:
the side rails are secured to upper edges of the sidewalls.

4. A truck according to claim 1 wherein:
the truck includes wheel housings positioned inboard of the inboard faces of the sidewalls; and
the side rails are secured to the inboard faces of the sidewalls proximate the tops of the wheel housings.

5. A truck according to claim 1 wherein:
the crossbars have a channel configuration and two adjacent crossbars are disposed with their respective channels in confronting relation;
the truck further includes a further bar having a width throughout its length less than the width of the channels of the crossbars so that the ends of the further bar may be slidably received within the channels of the adjacent crossbars and the further bar may be stowed in its entirety in the channel of a crossbar; and
means for locking the further bar in selected positions of transverse adjustment on the adjacent crossbars.

6. A truck according to claim 1 wherein:
the crossbar locking means comprise a series of longitudinally spaced holes in each side rail, holes in each end of each crossbar, and pins sized to fit in the holes in the side rails and in each crossbar.

7. A truck according to claim 5 wherein:
the further bar locking means comprise a series of transversely spaced holes in each adjacent crossbar, a hole in each end of said further bar, and a pin sized to fit in each hole in the further bar and in each adjacent crossbar.

8. A truck according to claim 5 wherein:
the further bar comprises a telescoping bar secured at its respective opposite ends to the adjacent crossbars.

9. A truck according to claim 1 wherein:
the truck further includes an accessory bar extending downwardly from one of said crossbars and mounted at its upper end for sliding transverse adjusting movement on said one crossbar and an elongated brace secured at one end to another one of said crossbars different from said one crossbar and extending longitudinally from said one end; and
coacting means are provided on another end of said brace and on the lower end of said accessory bar to enable the another end of the brace to bracingly engage the lower end of the accessory bar.

10. A truck according to claim 1 wherein:
the truck further includes an accessory bar extending downwardly from one of said crossbars and mounted at its upper end for sliding transverse adjusting movement on said one crossbar; and
said accessory bar includes socket means adapted to slidably receive a lower end of a 2×4 so as to enable the 2×4 to extend upwardly to a location above said side rails to provide cargo containment in an area above the side rails.

11. A truck according to claim 1 wherein:
said truck further includes an accessory bar extending downwardly from one of said crossbars and mounted at its upper end for sliding transverse adjusting movement on said one crossbars, and
said accessory bar includes a clamp mounted on a lower end of the accessory bar and selectably movable longitudinally relative to the accessory bar.

12. A truck according to claim 1 wherein:
said truck further includes brace members extending diagonally between said side rails and said cross bars.

13. A load stabilizing kit for use with a pickup truck including a truck bed and spaced sidewalls upstanding from opposite sides of the truck bed and including inboard faces coacting with the truck bed to define an upwardly opening cargo area, said kit comprising:
a pair of elongated channel side rails adapted to be fixedly secured to the inboard face of the respective sidewalls of the pickup truck, having a length corresponding generally to the length of the pickup truck sidewalls, and facing inward from the respective side walls to define confronting inwardly facing channels;
a plurality of channel crossbars adapted to be fixedly secured at their opposite ends to the side rails so as to extend transversely to a longitudinal axis of the truck at longitudinally spaced locations within the cargo area, each crossbar positioned at its opposite ends in the channels of the respective side rails for sliding longitudinal adjusting movement on the side rails, and each crossbar having a width throughout its length less than the width of the channels of the side rails so that the ends of the crossbars may be slidably received within the channels of the side rails and the crossbars may be stowed in their entirety in the channels of the side rails;
means for locking each crossbar in selected positions of longitudinal adjustment on the side rails;
a further bar adapted to extend between an adjacent pair of said crossbars and having a width throughout its length less than the width of the channels of the adjacent pair of said crossbars so that the ends of the further bar may be slidably received in the channels of the adjacent crossbars and the further bar may be stowed in its entirety in the channel of a crossbar; and
means for locking the further bar in selected positions of transverse adjustment on the adjacent crossbars.

14. A kit according to claim 13 wherein the crossbar locking means comprise a series of longitudinally spaced holes in each side rail, holes in each end of each crossbar, and pins sized to fit in the holes in the side rails and in the crossbars.

15. A kit according to claim 13 wherein:
the further bar locking means comprises a series of transversely spaced holes in each crossbar, at least one hole in each end of said further bar, and a pin sized to fit in the holes in the further bar and in each crossbar.

16. A kit according to claim 13 wherein:
the further bar comprises a telescoping bar adapted to be secured at its respective ends to two of said longitudinally spaced crossbars.

17. A kit according to claim 13 wherein:
the kit further includes an accessory bar extending downwardly from one of the crossbars and mounted at its upper end for sliding transverse adjusting movement on the one cross bar and an elongated brace adapted to be secured at one end to another one of the crossbars different from said one crossbar so as to extend lengthwise from said one end, and coacting means provided on another end of the brace and on the lower end of the accessory bar to allow the another end of the brace to bracingly engage the lower end of the accessory bar.

18. A kit according to claim 13 wherein:
the kit further includes an accessory bar extending downwardly from one of said crossbars and mounted at its upper end for sliding transverse adjusting movement on said one crossbar; and
said accessory bar includes socket means adapted to slidably receive the lower end of a 2×4 so as to enable the 2×4 to extend upwardly to a level above the side rails to provide cargo containment in an area above the side rails.

19. A kit according to claim 13 wherein:
the kit further includes an accessory bar extending downwardly from one of said crossbars and mounted at its upper end for sliding transverse adjusting movement on said one crossbar; and
said accessory bar includes a clamp mounted on the lower end of the accessory bar and selectably movable longitudinally relatively to the accessory bar.

20. A method of stabilizing loads carried in the cargo area defined between the sidewalls of a pickup truck including a truck bed and spaced sidewalls upstanding from opposite sides of the truck bed and including inboard faces coacting with the truck bed to define an upwardly opening cargo area, said method comprising the steps of:
providing a channel side rail extending lengthwise along each sidewall of the truck with the channels facing inwardly in confronting relation;
providing a plurality of channel crossbars extending transversely to a longitudinal axis of the cargo area at longitudinally spaced locations and each having a width throughout its length less than the width of the side rail channels so that the ends of each crossbar may be slidably positioned in the channels of the respective side rails and the crossbar may be stowed in its entirety in the channel of a side rail; and
providing a further bar extending longitudinally between adjacent crossbars and having a width less than the width of the adjacent crossbar channels so that the ends of the further bar may be slidably mounted in the channels of the adjacent crossbars.

21. A method according to claim 20 wherein the truck includes wheel housings positioned inboard of the inboard faces of the sidewalls; and
the step of providing a side rail extending longitudinally along each side wall of the truck comprises securing a side rail to the inboard face of each sidewall in a position proximate a top of the respective wheel housing, 22. A method according to claim 20 wherein the further bar is a telescoping bar and wherein the method includes the further step of:
selectively varying the length of the telescoping bar to match the distance between the adjacent crossbars.

23. A method according to claim 20 wherein the method includes the further steps of:
providing an accessory bar;
mounting a clamp on a lower end of the accessory bar; and
providing means for adjusting the clamp longitudinally within the cargo area relative to a lower end of the accessory bar.

24. A method according to claim 20 wherein the method includes the further steps of:
providing an accessory bar;
providing a brace secured at one end to one of the crossbars and extending longitudinally therefrom within the cargo area; and
securing another end of the brace to a lower end of the accessory bar so as to brace the lower end of the accessory bar.

* * * * *